Feb. 26, 1924. 1,485,067

L. R. BRISTOL

BALANCED BICYCLE BAG

Filed Oct. 17, 1923

Inventor
Loris R. Bristol
By Adam E. Fisher
J.G. Attorney

Patented Feb. 26, 1924.

1,485,067

UNITED STATES PATENT OFFICE.

LORIS ROOD BRISTOL, OF GAINESVILLE, FLORIDA.

BALANCED BICYCLE BAG.

Application filed October 17, 1923. Serial No. 669,036.

*To all whom it may concern:*

Be it known that LORIS R. BRISTOL, a citizen of the United States, residing at Gainesville, in the county of Alachua and State of Florida, has invented certain new and useful Improvements in Balanced Bicycle Bags, of which the following is a specification.

This invention pertains to bags attachable to an ordinary bicycle as means for carrying parcels, and the object of the invention is to provide a device of this nature having two bags adapted to set astraddle of the top bar of the bicycle frame, with means for securing the device to the frame, and with other attendant advantages as will appear in the course of this specification.

In the drawing—

Figure 1:
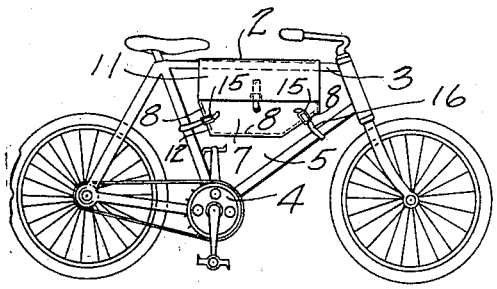
Figure 1 is a side elevation of the bags as attached to a bicycle.
Figure 4:
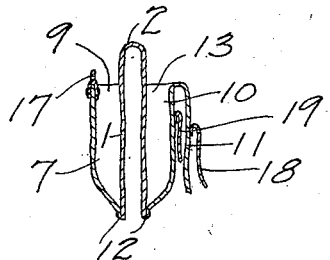
Figure 4 is a cross section, the bags being expanded and the flap thrown back.
Figure 2:
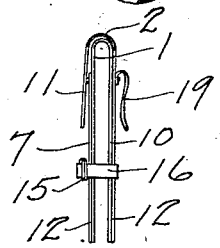
Figure 2 is a front elevation.
Figure 3:
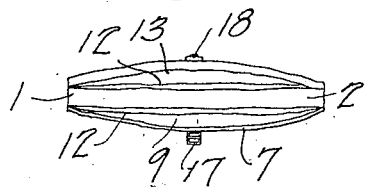
Figure 3 is a top view, the bags and flap being spread open to show the mode of construction.
Figure 5:
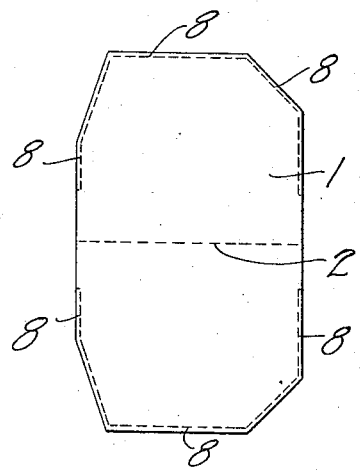
Figure 5 is a plan view of the back strip.
Figure 6:
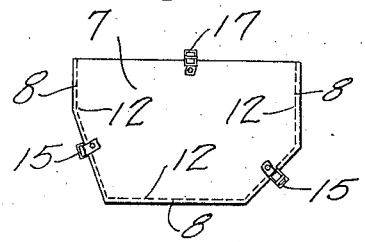
Figure 6 is a plan of a bag strip.
Figure 7:
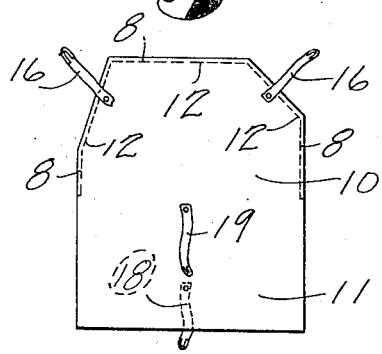
Figure 7 is a plan of a bag strip and integral flap.

In carrying out this invention, I provide a length of canvas or other suitable fabric to serve as a back strip 1, adapted when folded upon its center line 2 over the top bar 3 of the bicycle 4, to approximately fill at each side the open space 5 in the frame of the bicycle 4. A bag strip 7 is cut to meet the design of one end of the back strip and this strip is securely sewn at the seam 12 to the back strip around the side edges and bottom 8, leaving the open mouth 9 at the top. Likewise, a bag strip 10, having an integral flap 11, is cut to fit the other end of the back strip around the side edges and bottom 8 at the seam 12, leaving the open mouth 13 at the top and the free flap 11 adapted to fold down over the outer side of the opposite bag to exclude rain and dust. Corner buckles and straps 15 and 16 are provided to releasably secure the device to the frame of the bicycle, as shown. A buckle 17 is fastened to the free edge of the bag strip 7, an inner strap 18 to the inner side of the flap 11, and an outer strap 19 to the outer side of the flap 11, either straps being adapted to engage the buckle 17, as may be desired.

In use, it is found that these bags will carry a large number of parcels without interfering with the movements of the rider. These parcels may be divided between the two bags so as to balance each other on the frame. The flap 11 may be tucked down into the opposite bag and the outer strap 19 buckled to the buckle 17 over the top bar 3, or the flap 11 may be positioned outwardly over the outer side of the bag strip 7 to exclude rain or dirt, and the inner strap 18 secured to the buckle 17.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

A device of the kind described, comprising in combination with a bicycle frame, a back strip of fabric adapted to fold over the top bar of the frame and approximately fit and fill at each side, the open space of the frame; a bag strip sewn by its side and bottom edges to one end of the back strip; a combined bag strip and flap sewn by its side and bottom edges to the opposite end of the back strip with the flap left free to fold down over the outer side of the opposite bag strip; straps and buckles at the lower corners adapted to releasably secure the device to the frame; a buckle on the free edge of the individual bag strip; and inner and outer straps on the flap of the combined bag strip and flap adapted separately to engage the said buckle.

In testimony whereof I affix my signature.

LORIS ROOD BRISTOL.

Witnesses:
D. C. LAIRD,
L. M. BRISTOL.